Jan. 1, 1924. 1,479,348
E. E. WICKERSHAM
EQUALIZING MECHANISM FOR TRACTORS
Filed Jan. 26, 1921   2 Sheets-Sheet 2
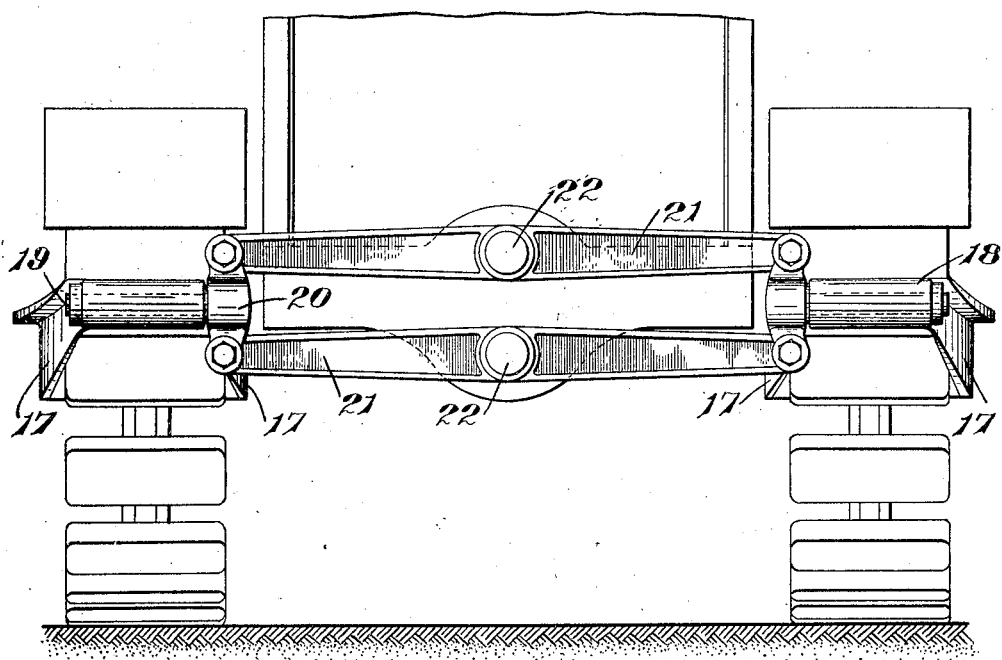
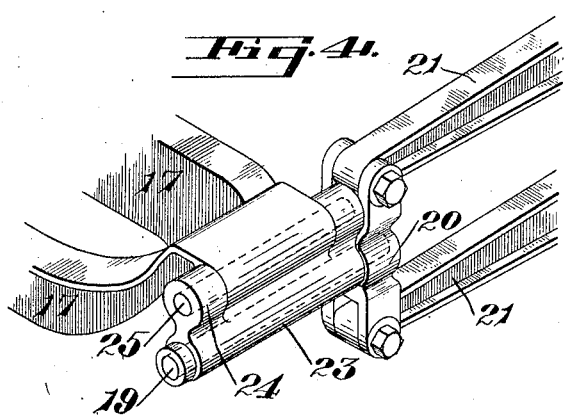
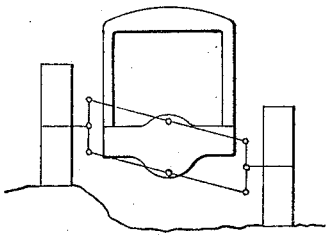
INVENTOR.
ELMER E. WICKERSHAM.
BY Chas. E. Townsend
ATTORNEY.

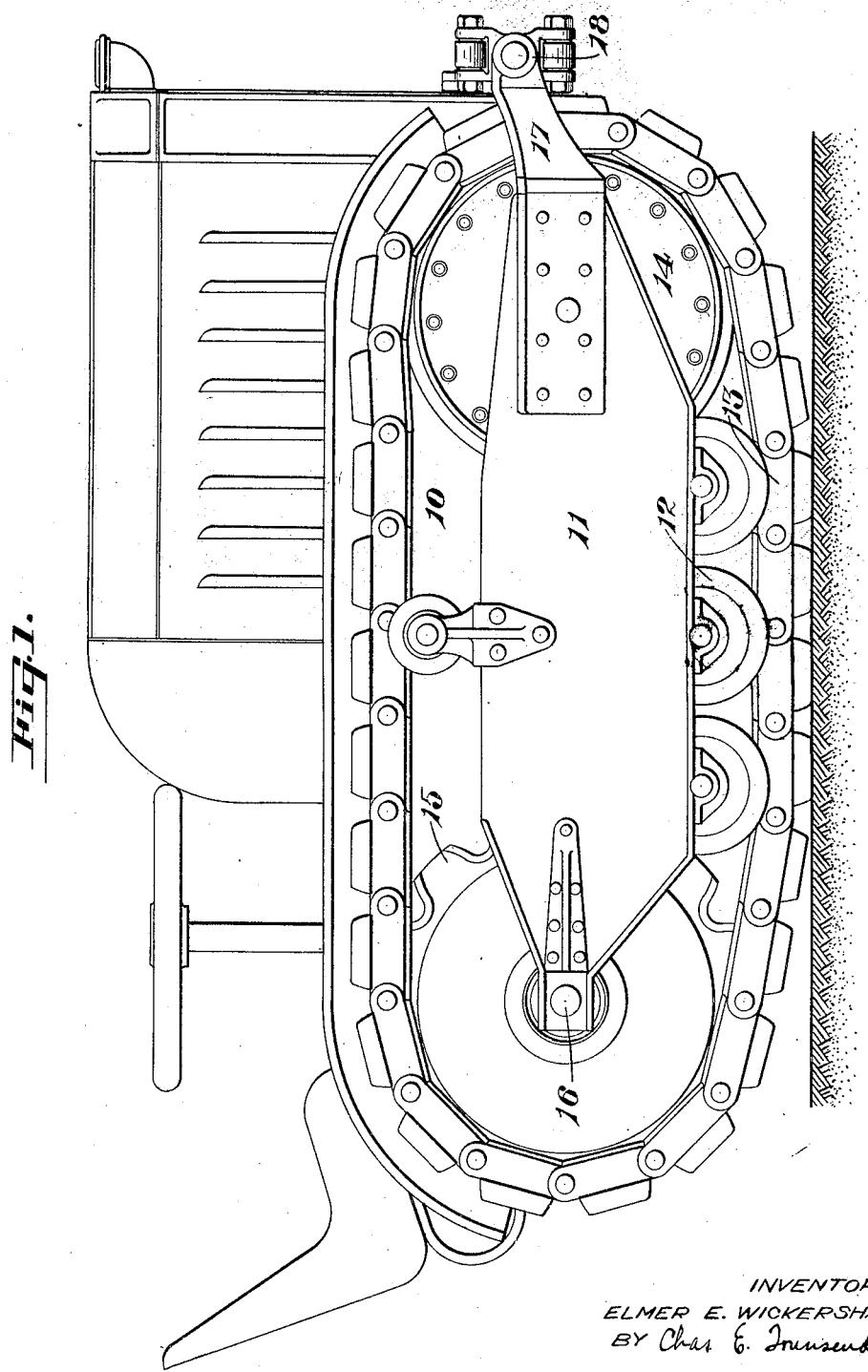

Patented Jan. 1, 1924.

1,479,348

UNITED STATES PATENT OFFICE.

ELMER E. WICKERSHAM, OF OAKLAND, CALIFORNIA, ASSIGNOR TO THE HOLT MANUFACTURING COMPANY, OF STOCKTON, CALIFORNIA, A CORPORATION OF CALIFORNIA.

EQUALIZING MECHANISM FOR TRACTORS.

Application filed January 26, 1921. Serial No. 439,981.

*To all whom it may concern:*

Be it known that I, ELMER E. WICKERSHAM, a citizen of the United States, residing at Oakland, in the county of Alameda and State of California, have invented new and useful Improvements in Equalizing Mechanism for Tractors, of which the following is a specification.

This invention relates to tractors of the self-laying track type and more particularly to equalizing mechanism for supporting the weight of the main frame upon the truck mechanisms.

It is usual in tractors of this type to employ an equalizing bar centrally pivoted to the main frame and connected at its ends to opposite truck mechanisms for equally distributing the weight of the forward part of the main frame upon the opposite truck mechanisms. Prior forms of equalizing bars have no provision for keeping the truck mechanisms in vertical position, and therefore there is a tendency when the truck mechanisms rock about their pivotal connection with the main frame to tow in at the bottom. This action on the part of the truck mechanism causes the front sprocket wheels to so incline as to interfere with the proper operation of the track. The object of the present invention is to make provision in connection with equalizing mechanisms of this type for keeping the truck mechanisms in vertical positions at all times. This I accomplish by the arrangement of parallel bars so connected to the truck frames as to positively maintain them in a vertical plane regardless of the extent of rocking movement which they may pass through.

In the accompanying drawings Fig. 1 shows a side elevation of a tractor embodying my invention, Fig. 2 shows a front view of the same, Fig. 3 shows a diagram of the action of my improved equalizing mechanism, Fig. 4 shows a perspective view of a modified form of connection.

I show a tractor which includes a main frame 10 at each side of which is a roller truck frame 11 pivotally connected at its rear end to the main frame. The truck frame carries rollers 12 which operate on the ground stretch of the track 13 and an idler sprocket wheel 14 is arranged at the forward end of the truck frame. A rear driving sprocket wheel 15 is carried on an axle 16 directly connected to the main frame, and in the present instance I show the truck frames 11 pivotally connected to this axle although it is obvious that the truck frames may be connected in other ways to the main frame for rocking movement.

The front end of each truck frame is fitted with extension arms 17 which are connected together at a point in front of the track by means of a sleeve or bearing 18. This sleeve or bearing receives a bolt or stem 19 which carries at its inner end a cross head 20 disposed in a vertical plane. This cross head is pivotally connected at each end to an equalizer bar 21 and both equalizer bars are separately pivoted at the middle portion to the main frame, as shown at 22. Opposite cross heads are thus connected together by parallel bars 21 and in operation these cross heads will always be kept in parallel relation and in vertical position. Hence the truck frames being connected to these cross heads by means of the stem or bolt 19 will be positively held against twisting or turning or in any way getting out of a vertical position. This action is made clear by the diagram of Fig. 3.

In Fig. 4 I make use of a shackle connection to compensate for the arcuate movement of the truck frames, and this necessitates a bearing or sleeve 23 which is formed on the lower end of a pendent link 24, which links at their upper ends are bored to receive a pin 25 for connecting the ends of the truck frame thereto. The bearing or sleeve 23 receives the stem of the cross head 20 and is free to swing so that the truck frames may rock in a vertical plane through an arcuate path.

Having thus described my invention, what I claim and desire to secure by Letters Patent is—

1. In a tractor of the self-laying track type, a main frame, a truck mechanism at each side thereof pivotally connected at one end to the main frame for rocking movement in a vertical plane and equalizing means between the opposite ends of the truck mechanisms and the main frame comprising parallel equalizing bars centrally pivoted to the main frame and vertically disposed cross heads connecting the ends of said equalizing bars together and a pivotal connection formed between each cross head and the adjacent truck mechanism.

2. In a tractor of the self-laying track type, a main frame, a truck mechanism at each side thereof pivotally connected at one end to the main frame for rocking movement in a vertical plane and equalizing means between the opposite ends of the truck mechanisms and the main frame comprising parallel equalizing bars centrally pivoted to the main frame and vertically disposed cross heads connecting the ends of said equalizing bars together and a stem on each cross head rotatably connected to the adjacent truck mechanism.

3. In a tractor of the self-laying track type, a main frame, a truck mechanism at each side thereof pivotally connected at one end to the main frame for rocking movement in a vertical plane and equalizing means between the opposite ends of the truck mechanisms and the main frame comprising parallel equalizing bars centrally pivoted to the main frame, vertically disposed cross heads connecting the ends of said equalizing bars together, a stem on each cross head and a shackle connection between said stem and the adjacent truck mechanism.

4. In a tractor of the self-laying track type a main frame, a truck mechanism at each side connected thereto for rocking movement in a vertical plane, and an equalizing connection between the main frame and opposite truck mechanisms comprising a pair of parallel equalizing bars centrally pivoted to the main frame, cross heads connecting the ends of said bars together, a stem on each cross head and an elongated bearing on the adjacent truck mechanism to receive said stem rotatably.

ELMER E. WICKERSHAM.